Aug. 29, 1967       B. WALKER       3,338,111
IDLE FUEL SHUT OFF CONTROL
Filed Oct. 23, 1965
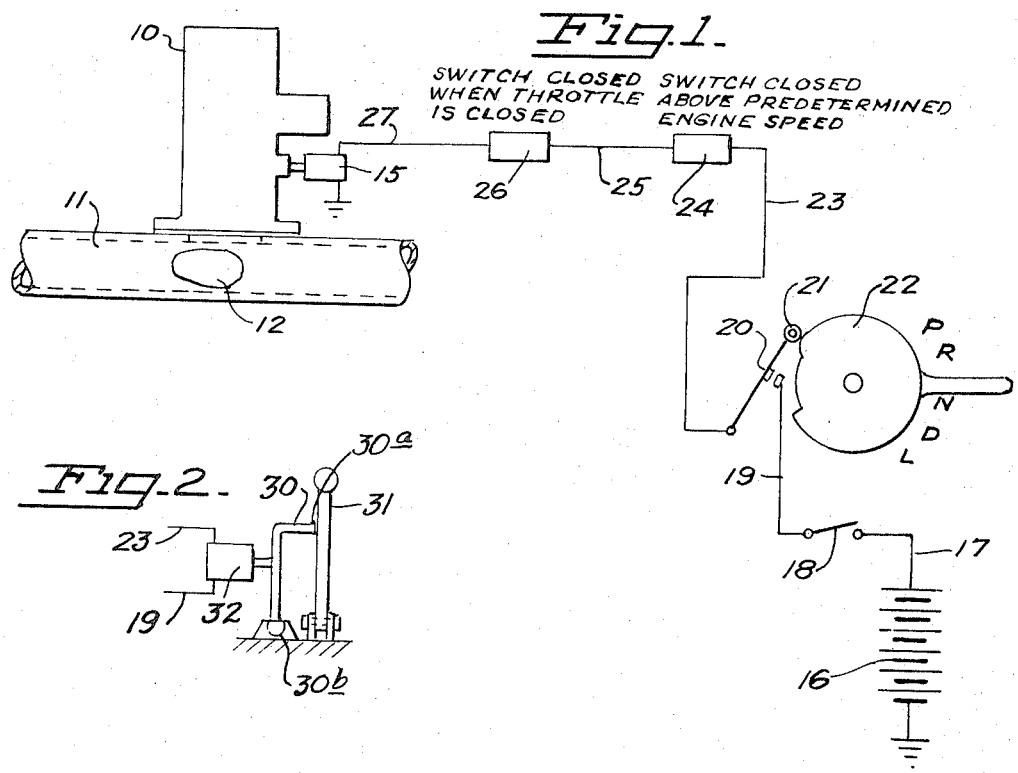
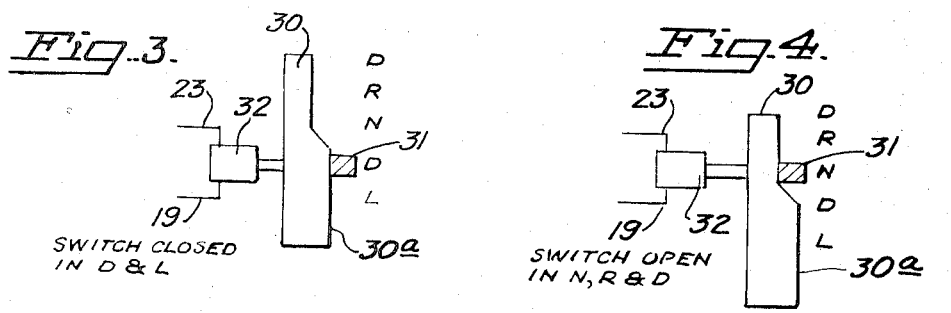
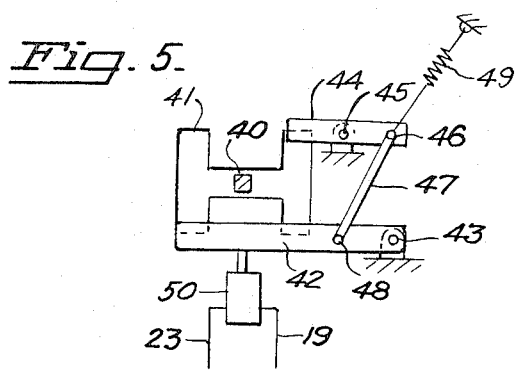
INVENTOR
Brooks Walker

United States Patent Office 3,338,111
Patented Aug. 29, 1967

3,338,111
IDLE FUEL SHUT OFF CONTROL
Brooks Walker, 1280 Columbus Ave.,
San Francisco, Calif. 94100
Filed Oct. 23, 1965, Ser. No. 504,010
8 Claims. (Cl. 74—472)

The object of this invention is to control the idle fuel shut off in such a manner that such shut off does not occur in neutral, park, or reverse, but does occur in drive and low or intermediate.

An object of this invention is to provide an interlock with the transmission shift so that when in neutral, park, or reverse, the idle fuel shut off will not operate on engine decelerations with closed throttle above the predetermined engine speed used when operating the vehicle in drive or lower forward gears, to control idle fuel shut off.

If the fuel is shut off when decelerating in neutral or park the light flywheels used on multicylinder engines (which may be tight) leaves such a short time to turn on the fuel and wet the manifold that stalling of the motor may result.

The advantages lost in smog reduction by not turning off the idle fuel when in neutral, park, or reverse are negligible and the increased drivability by reducing the tendency to stall is large.

Though I have shown the cut out of the fuel shut off in park, neutral, and reverse, it may be designed to operate only in park and neutral and not in reverse by changing the cam that operates the cut out switch.

Other objects will be pointed out in the accompanying specification and claims.

I have illustrated my invention by way of example in the accompanying figures, in which:

FIG. 1 is a diagrammatic view of one form of my invention.

FIG. 2 is an elevation view of a transmission shift lever and interlocked switch forming a part of the invention in another form.

FIG. 3 is a plan view similar to FIG. 2 with the shift lever in "D" position.

FIG. 4 is a plan view similar to FIG. 3 with the shift lever in "N" position.

FIG. 5 is a plan view of an "H" manual stick shift and interlocked switch forming a part of another form of this invention.

In all figures like numerals refer to corresponding parts.

In FIGS. 1, 2, 3, and 4 I have shown a carburetor 10 mounted on an engine 11 with an intake manifold 12. A solenoid operated idle fuel shut off 15 is operated by a circuit including a battery 16, wire 17, ignition switch 18, wire 19, transmission shift operated switch 20, wire 23, speed sensitive switch 24, wire 25, throttle controlled switch 26 and wire 27. Throttle controlled switch 26 is closed only when the throttle is closed. Speed sensing switch 24 is closed above a predetermined speed as shown in my U.S. Patent No. 3,204,620, entitled Speed Sensing Device, issued Sept. 7, 1965.

In FIG. 1 transmission shift control 22 includes the usual indication P-R-N-D-L and an associated rotating cam. Roller 21 contacts the cam and operates switch 20 to close the switch 20 when the shift is in D and L only and open the switch 20 and circuit to solenoid 15 when in P-R or N. This reduces the tendency of the engine to stall when decelerating in these three positions which do not need idle fuel shut off for smog control on any of the present California Motor Vehicle Pollution Control Board tests.

If a stick shift is used for an automatic transmission as shown in FIGS. 2, 3, and 4, a rider 30 is pivoted at 30b. The cam 30a rides against shift arm 31. Rider 30 has a stepped face cam 30a so that the portion of rider 30 which contacts switch 32 is moved to the left as viewed in these figures when in D and L to close switch 32. Switch 32 would take the place of switch 20 of FIG. 1 if a stick shift is used. This construction cuts out the idle fuel shut off when in P-R and N but makes it effective in D and L for good smog control and no engine stalling in neutral, park or reverse due to the idle fuel cut off being inoperative in these positions in this invention.

In FIG. 5 I have shown a manual transmission stick shift of the conventional H form with shift lever 40 operating in H channel 41. Lever 42 is pivoted at 43 and is urged upward, as viewed in FIG. 5, by spring 49 which is so light as not to interfere with shift lever 40 while shifting or driving. Arm 44 is pivoted at 45, the link 47 is connected to arm 44 at 46 and to arm 42 at 48, so that as arm 4 moves clockwise arm 42 moves counter clockwise. The results in switch 50 being close when in L, second, or H, and being open when in neutral or R for the same advantages as pointed out in connection with the previous figures.

Though symbols such as P, R, N, D, L are used, they are symbolic of Park, Reverse, Neutral, Drive, and Lower gears, and the symbols may be changed in England or different in other languages, all within the scope of this invention. This applies to the specification as well as the claims.

I have illustrated my invention in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

I claim as my invention:

1. An engine having a carburetor, an idle fuel cut off mechanism that operates to cut off the idle fuel at closed throttle above a predetermined engine speed, a transmission shift control with P.R.N.D. positions, an interlock with said transmission shift control to cut out the idle fuel cut off when said transmission control is in N position but operative when in D position.

2. A device as defined in claim 1, in which said idle fuel cut off mechanism is rendered inoperative when said transmission shift is in either N or P positions.

3. A device as defined in claim 1, in which said idle fuel cut off mechanism is rendered inoperative when said transmission shift is in P, N or R but operative when in D or L positions.

4. A device as defined in claim 1, in which said mechanism includes an electric circuit and a source of E.M.F., a switch in said circuit, said switch operated by said transmission shift control, said transmission shift control opening said switch when in N position.

5. A device as defined in claim 1, in which said transmission shift control operates a cam that renders said mechanism inoperative when said transmission control is in N position.

6. A device as defined in claim 5, in which said mechanism includes an electric circuit, a switch, said switch operated by said cam to render said mechanism inoperative to shut off said idle fuel at closed throttle high speed engine decelerations when in N position but said mechanism will be effective to shut off said idle fuel when decelerating above a predetermined speed with a closed throttle when in D position.

7. A device as defined in claim 6, in which said mechanism includes a second speed sensing switch, a third switch closed when the throttle is closed, said second and third switches interconnected with said first mentioned switch that is operated by said transmission shift to effect the control as cited in this claim.

8. A device as defined in claim 1, in which said transmission shift is a stick shift operating in a relatively straight line, a rider that operates in contact with said shift lever, said rider being in a different position when said shift lever is in N than when in D, said different position in N being a link in the control that renders said mechanism ineffective to cut off the idle fuel when decelerating under certain conditions but effective to cut off said idle fuel when said transmission control is in P position.

References Cited

UNITED STATES PATENTS 2,765,670  10/1956  Winkler _____ 123—198 X
2,933,075  4/1960  Geffroy _____ 123—97

FOREIGN PATENTS 579,663  8/1958  Italy.

MARK NEWMAN, *Primary Examiner.*

R. D. BLAKESLEE, *Examiner.*